United States Patent [19]

Yamamoto et al.

[11] Patent Number: 5,068,287

[45] Date of Patent: Nov. 26, 1991

[54] PRIMER COMPOSITIONS

[75] Inventors: Shosaku Yamamoto; Kazuo Kakinuma, both of Yokohama, Japan

[73] Assignee: Nippon Oil and Fats Co., Ltd., Japan

[21] Appl. No.: 611,775

[22] Filed: Nov. 9, 1990

Related U.S. Application Data

[60] Division of Ser. No. 197,149, May 23, 1988, Pat. No. 4,985,500, which is a continuation of Ser. No. 3,238, Jan. 14, 1987, Pat. No. 4,830,778.

[30] Foreign Application Priority Data

Jan. 23, 1986 [JP] Japan ................................... 61-11152

[51] Int. Cl.$^5$ ............................................. C08F 8/30
[52] U.S. Cl. ..................... 525/124; 525/123; 525/127; 525/157; 525/163; 525/131; 525/440; 525/403; 525/443; 525/130; 525/164

[58] Field of Search ............... 525/124, 163, 123, 127, 525/157, 131, 440, 403, 443, 130, 164

[56] References Cited

U.S. PATENT DOCUMENTS 4,985,500 1/1991 Yamamoto et al. ................ 525/163

*Primary Examiner*—Melvyn I. Marquis
*Attorney, Agent, or Firm*—Parkhurst, Wendel & Rossi

[57] ABSTRACT

A primer composition usable for steel sheets and plastic sheets in vehicle bodies consists essentially of a component (A) consisting essentially of at least one resin having a glass transition temperature of not higher than $-20°$ C., preferably not lower than $-75°$ C., and an elongation at break of not less than 400% preferably not greater than 900%, at 20° C. and a component (B) consisting essentially of at least one crosslinking resin, the weight ratio of solid content of (A) to (B) being 70-99:-30-1.

5 Claims, No Drawings

PRIMER COMPOSITIONS

This is a division of application Ser. No. 07/197,149 filed May 23, 1988 now U.S. Pat. No. 4,985,500, which in turn is a continuation of Ser. No. 07/003,238 filed Jan. 14, 1987, now U.S. Pat. No. 4,830,778.

BACKGROUND OF THE INVENTION

1. Field of the Invention

This invention relates to a primer composition adaptable for both steel sheet and plastic sheet as vehicle bodies.

2. Related Art Statement

Lately, the use of plastic materials for automotive parts has rapidly progressed since it can reduce the weight of the vehicle body, act as a rust-preventing means and increase freedom of design in the automobile industry. Moreover, the vehicle body is typically formed by intricately combining steel sheet with plastic sheet.

In this case, there has hitherto been adopted a method wherein the painting of all the materials is first performed and then the painted materials are assembled in a final step.

The steel sheet is degreased and phosphated to form a phosphate layer thereon. After an under coat is formed by electrodeposition, a chipping primer or a stoneger coat is partially applied and then an intermediate coat and a top coat are formed thereon.

On the other hand, the plastic sheet is degreased, dried and coated with a primer for the plastic sheet. Then, an exclusive intermediate coat and an exclusive top coat are successively formed thereon. In this case, the formation of the exclusive intermediate coat may be omitted.

Thereafter, the painted plastic sheet is assembled onto the painted steel sheet.

In another painting method, the plastic sheet is degreased, dried, coated with an exclusive primer, baked and then assembled onto the steel sheet which is previously degreased, phosphated and coated with an under coat, and thereafter the common intermediate coat and top coat are formed and baked on the assembly of the plastic sheet and steel sheet.

According to these conventional painting methods, however, the structure of the resulting paint coats formed is different between the plastic sheet and the steel sheet and the paint used and the painting step are also different, so that there are caused the following problems:

(1) Since the painting equipment must be separately arranged for the painting of steel sheet and for the painting of plastic sheet, not only the operation efficiency is poor but also the huge equipment investment is required;

(2) The difference in appearance such as color tone, gloss and the like is caused between the plastic sheet and the steel sheet to degrade the commercial value of the automobile as a whole;

(3) The difference in the durability of painted coating is caused between the plastic sheet and the steel sheet to detract from the appearance of the automobile over time; and (4) When the plastic sheet is coated with the exclusive primer, assembled into the steel sheet and then the resulting assembly is subjected to a painting together, there problems (1)–(3) above are not caused. In the selection of paints for intermediate coat and top coat, however, when a soft coating is used in compliance with the plastic sheet, the weather resistance, polishing property, solvent resistance, stain resistance and the like are degraded, and when a hard coating is used in compliance with the steel sheet, the impact resistance, chipping resistance and the like on the plastic sheet are degraded.

SUMMARY OF THE INVENTION

The present invention is directed to a primer composition consisting essentially of a component (A) consisting essentially of at least one resin having a glass transition temperature of not higher than $-20°$ C. and an elongation at break of not less than 400% at 20° C. and a component (B) consisting essentially of at least one crosslinking resin. The weight ratio as solid resin content of component (A) to component (B) is 70-99:30-1. The primer composition is applied onto an under coat formed in the case of the steel sheet, by electrodeposition and, in the case of the plastic sheet, as a primer for plastic, whereby the simultaneous painting of the intermediate coat and top coat as a hard coating used for steel sheet is possible and the aforementioned problems can be solved.

That is, the invention provides a primer composition consisting mainly of a component (A) composed of at least one resin having a glass transition temperature of not higher than $-20°$ C. and an elongation at break of not less than 400% at 20° C. and a component (B) composed of at least one crosslinking resin, and having a weight ratio as solid resin content of component (A) to component (B) of 70-99:30-1.

DESCRIPTION OF THE PREFERRED EMBODIMENTS

The component (A) used in the invention is selected from well-known polyurethane resin, polyvinyl resin, polyolefin resin, polyester resin, polyacrylic resin and linear high molecular weight elastomer composed fundamentally of their modified resin.

On the other hand, the component (B) used in the invention is selected from well-known melamine resin, urea resin, polyisocyanate resin and a modified resin thereof, and may include resins capable of chemically reacting with the crosslinking resin, such as a reactive functional group containing acrylic resin, epoxy resin, polyester resin, polyurethane resin and so on.

When the resin used as the component (A) has a glass transition temperature of higher than $-20°$ C. and an elongation at break of less than 400% at 20° C., the flexibility of the resulting coat is poor, and the impact resistance and chipping resistance on the plastic sheet are not satisfied, and the chipping resistance on the steel sheet is also poor.

Even when the resin satisfies the conditions defined as the component (A), if only the component (A) is used, the ability to withstand heating-cooling cycles is poor when used as an overall coat comprising an under coat, an inter (i.e., intermediate) coat and a top coat and considerable cracks are undesirably caused in the coating. For this reason, the component (A) is used together with the component (B) in a weight ratio as solid resin content of component (A) to component (B) of 70-99:30-1, whereby satisfactory heating-cooling cycle properties can be obtained. According to the invention, the components (A) and (B) are essential.

Since the component (B) is a crosslinking resin as mentioned above, when the solid content of component (B) in the primer composition exceeds 30% by weight, the flexibility of the resulting coating lowers, and the chipping resistance and impact resistance on the plastic sheet are poor, and the chipping resistance on the steel sheet is not satisfied, while when it is less than 1% by weight, the crosslinking effect is poor, and the heating-cooling cycle property is deteriorated, and cracks are produced in the coating.

The primer composition consisting of the components (A) and (B) according to the invention may contain a pigment. As the pigment, mention may be made of inorganic and organic pigments usually used in the paint, such as titanium dioxide, carbon black, talc, kaolin, calcium carbonate, magnesium carbonate, barium sulfate, iron oxide, cyanine blue, quinacridone red and so on. In order to form the inter coat and top coat by electrostatic painting, it is favorable if the resulting coating has electrical conductivity. In this case, a conductive pigment, particularly conductive carbon black can be used, wherein the surface resistivity is usually suitable to be not more than $10^{10}$ Ω.cm.

In the primer composition according to the invention, it is desirable that a ratio of pigment to components (A)+(B) is 0-2.0. When this ratio exceeds 2.0, the flexibility of the coating is poor, and the chipping resistance on the steel sheet and the chipping resistance and impact resistance at low temperature on the plastic sheet are poor.

Organic solvent is provided to uniformly dissolve the components (A) and (B) and stably store them for a long term. Suitable solvents include organic solvents for usual paint, such as ketones, esters, aromatics, alcohols, aliphatics and the like.

If necessary, the primer composition according to the invention may be compounded with additives for paint such as surface regulating agent, antisettle agent, heat degradation preventing agent, light degradation preventing agent, pigment dispersing agent and the like as well as a reaction catalyst for promoting the reaction.

The primer composition according to the invention may be produced by the usual paint manufacturing process or pigment dispersing process. When the primer composition does not contain a pigment, it can be produced by mixing the components (A) and (B) with, if necessary, additives for paint and organic solvent in the well-known agitating device such as dissolver to form a uniform resin solution. On the other hand, when the primer composition contains a pigment, it can be produced by dispersing the pigment into a part or whole of the resin in the well-known pigment dispersing machine such as attritor, sand mill or the like and then adding the remaining resin, organic solvent and additives for paint thereto so as to adjust the viscosity to a given value.

As a means for applying the primer composition according to the invention, use may be made of well-known painting manners such as air spraying, electrostatic air spraying, electrostatic spray painting and the like.

The primer composition according to the invention is simultaneously applicable to the steel sheet for vehicle bodies after painting an under coat and the plastic sheet after degreasing and drying. After the application of the primer composition, the primer coating is left to stand at room temperature for 1-10 minutes, or forced drying is carried out at 80° C. for about 30 minutes. Then, inter and top coats usually used can be formed thereon.

Even when the primer composition is applied to both the steel sheet and plastic sheet, the painting of inter coat can be omitted, if necessary. As a paint for inter coat and top coat, there may be used paints usually used for the steel sheet for a vehicle body and the plastic sheet.

As the plastic material applicable to the primer composition according to the invention, mention may be made of ones used as a plastic for vehicle body, such as polyamide resin, polybutylene terephthalate resin, polyurethane resin, polycarbonate resin, unsaturated polyester resin, polypropylene resin, a mixture thereof, a reinforced resin thereof and the like. However, the invention is not restricted to these resins as a plastic material.

As mentioned above, the primer composition according to the invention can simultaneously be applied to the steel sheet for a vehicle body and the plastic sheet for a vehicle body owing to the presence of the components (A) and (B) at a particular weight ratio, so that it is possible to simultaneously paint the same hard inter coat and hard top coat to both the sheets with the same painting equipment and to effect the baking in the same baking furnace. Therefore, the uniformity of qualities in the painted coats on both the sheets, for example, appearance qualities such as color tone, gloss and the like and durability qualities such as weather resistance, chemical resistance and the like can be made complete.

Further, when the primer composition according to the invention is applied to the undercoated steel sheet, the chipping resistance, heating-cooling cycle property and the like are improved, and when it is applied to the plastic sheet for vehicle body, the chipping resistance, heating-cooling cycle property, impact resistance and the like are improved.

The following examples are given in illustration of the invention and are not intended as limitations thereof. In the examples, all percentages are by weight, unless otherwise stated.

EXAMPLE 1

Production of Primer 100 g of a mixture having a compounding recipe as shown in Table 1 was mixed in a dissolver and added with an equal mixed solution of xylene and butyl acetate so as to adjust a spraying viscosity to 13 seconds (20° C.) as Ford cup No. 4, whereby a primer composition was produced.

EXAMPLES 2–17, COMPARATIVE EXAMPLES 1–5

Production of Primer 100 g of a mixture having a compounding recipe as shown in Table 1 was thoroughly kneaded in a dissolver and then mixed in a paint shaker for 1 hour. The resulting composition was added with an equal mixed solution of xylene and butyl acetate so as to adjust a spraying viscosity to 13 seconds (20° C.) as Ford cup No. 4.

The details of components shown in Table 1 are as follows.

Polyurethane resin varnish I:

Resin solution prepared by adding an equal mixed solution of xylene and methyl isobutyl ketone (MIBK) to Sanprene LQ-377 (trade name, made by Sanyo Chemical Industries, Ltd., elongation at break: 610%, glass transition temperature: −35° C.) and having a solid content of 20%

Polyurethane resin varnish II:

Resin solution prepared by adding an equal mixed solution of xylene and MIBK to Sanprene LQ-X35B (trade name, made by Sanyo Chemical Industries, Ltd., elongation at break: 440%, glass transition temperature: −20° C.) and having a solid content of 20%

Polyurethane resin varnish III:

Resin solution prepared by adding an equal mixed solution of xylene and MIBK to Nipporan 2301 (trade name, made by Nippon Polyurethane Industry Co., Ltd., elongation at break: 600%, glass transition temperature: −20° C.) and having a solid content of 15%

Polyurethane resin varnish IV:

Resin solution prepared by adding an equal mixed solution of Cellosolve acetate (trade name) and MIBK to Desmorac 2100 (trade name, made by Sumitomo Bayer Urethane Co., Ltd., elongation at break: 350%, glass transition temperature: −15° C.) and having a solid content of 15%

Ethylene-vinyl acetate copolymer resin varnish I:

Resin solution prepared by adding a mixed solution of xylene and MIBK with a mixing ratio of 2:1 to Evaflex ® 150 (trade name, made by Mitsui Polychemical Company, Ltd., elongation at break: 900%, glass transition temperature: −30° C.) and having a solid content of 20%

Ethylene-vinyl acetate copolymer resin varnish II:

Resin solution prepared by adding a mixed solution of xylene and MIBK with a mixing ratio of 2:1 to Evaflex ® 410 (trade name, made by Mitsui Polychemical Company, Ltd., elongation at break: 300%, glass transition temperature: −20° C.) and having a solid content of 15%

Ethylene-vinyl acetate copolymer resin varnish III:

Resin solution prepared by adding an equal mixed solution of toluene and xylene to MB-600 (trade name, made by Nippon Unicar Co., Ltd., elongation at break: 880%, glass transition temperature: −75° C.) and having a solid content of 10%

Ethylene-ethyl acrylate copolymer resin varnish:

Resin solution prepared by adding an equal mixed solution of toluene and xylene to MB-870 (trade name, made by Nippon Unicar Co., Ltd., elongation at break: 800%, glass transition temperature: −75° C.) and having a solid content of 10%

Polyolefin resin varnish:

Resin solution prepared by adding toluene to Unistol P (trade name, made by Mitsui Petrochemical Industries, Ltd., elongation at break: 500%, glass transition temperature: −40° C.) and having a solid content of 7%

Chlorinated ethylene-vinyl acetate copolymer resin varnish:

Resin solution prepared by adding an equal mixed solution of toluene and xylene to Superchlon BX (trade name, made by Sanyo-Kokusaku Pulp Co., Ltd., elongation at break: 600%, glass transition temperature: −50° C.) and having a solid content of 15%

Polyisocyanate resin varnish:

Coronate HL (trade name, made by Nippon Polyurethane Industry Co., Ltd., solid content: 75%)

Block isocyanate resin varnish:

TPKL-5-2544 (trade name, made by Sumitomo Bayer Urethane Co., Ltd., solid content: 75%)

n-Butylated urea resin varnish:

Super Bekamin P-138 (trade name, made by Dainipon Ink and Chemicals, Inc., solid content: 60%)

Isobutylated melamine resin varnish:

Yuban 60R (trade name, made by Mitsui Toatsu Chemicals, Inc., solid content: 50%)

Titanium dioxide:

JR-602 (trade name, made by Teikoku Kako Co., Ltd.)

Carbon black:

Rarben 420 (trade name, made by Columbian Carbon, Japan)

Conductive carbon black:

Vulcan XC-72 (trade name, made by Cabot Corp.)

Calcium carbonate:

Homokal D (trade name, made by Shiraishi Kogyo K.K.)

Painting of steel sheet

A cold rolled steel sheet of 0.8 mm × 70 mm × 150 mm was subjected to a phosphating treatment with Bonderite #3004 (trade name, made by Nihon Parkerizing Co., Ltd.), coated with a cation electropaint of Aqua No. 4100 (trade name, made by Nippon Oil and Fats Co., Ltd.) as an under coat, and then dried by baking at 175° C. for 20 minutes. The dried thickness of the resulting electrocoating was 20 μm.

Then, each of the aforementioned primer compositions was applied by an air spray painting process, and thereafter Epico No. 1500 Sealer TX-100 (trade name, made by Nippon Oil and Fats Co., Ltd.) was applied as an amino/oil-free polyester resin series inter coat of wet-on-wet system by an air spray painting process and dried by baking at 140° C. for 30 minutes. The dried thickness of the primer was 5–8 μm, and that of the inter coat was 30–35 μm.

Next, an amino/alkyd resin series solid color of Melami No. 1 Red (trade name, made by Nippon Oil and Fats Co., Ltd.) was applied as a top coat by an air spray painting process and dried by baking at 140° C. for 30 minutes. The dried thickness of the top coat was 40 μm.

Painting of plastic sheet

I. Plastic sheet
  (A) Polyamide resin sheet (PA) 1014RX-109 (trade name, made by Ube Industries, Ltd.)
  (B) Polybutylene terephthalate resin sheet (PBT) 5201X11 (trade name, made by Toray Industries, Inc.)
  (C) Unsaturated polyester resin sheet (SMC) N12 (trade name, made by Takeda Chemical Industries, Ltd.)
  (D) Polyurethane resin sheet (PU) C1056/FA720 (trade name, made by Nippon Polyurethane Industry Co., Ltd.)
  (E) Polycarbonate resin sheet (PC) Yupiron MB-2201 (trade name, made by Mitsubishi Gas Chemical Company, Inc.)

II. Painting process

Each of the above plastic sheets having a size of 3 mm × 70 mm × 150 mm was degreased with a vapor of 1,1,1-trichloroethane (74° C.) for 60 seconds, dried, coated with the aforementioned primer by an air spray painting process, and then coated with Epico No. 1500 Sealer TX-100 as an amino/oil free polyester resin series inter coat of wet-on-wet system by an air spray painting process, which was then dried by baking at 140° C. for 30 minutes. The dried thickness of the primer was 5–8 μm, and that of the inter coat was 30–35 μm. Thereafter, the amino/alkyd resin paint of Melami No. 1 Red was applied as a top coat by an air spray painting process and dried by baking at 140° C. for 30 minutes. The dried thickness of the top coat was 40 μm.

COMPARATIVE EXAMPLE 6

The same procedure as described in Example 1 was repeated except that the application of the primer composition was omitted.

COMPARATIVE EXAMPLE 7

The same procedure as described in Example 2 was repeated except that Plagloss No. 3000 Red (trade name, made by Nippon Oil and Fats Co., Ltd.) as a top coat grade for bumper was applied as a top coat by an air spray painting process instead of Melami No. 1 Red and dried by baking at 120° C. for 30 minutes. The dried thickness of the top coat was 40 μm.

TABLE 1

| Primer composition | Elongation at break 20° C. | Glass transition temperature | Example 1 | 2 | 3 | 4 | 5 | 6 |
|---|---|---|---|---|---|---|---|---|
| Component (A) | | | | | | | | |
| polyurethane resin varnish I | 660% | −35° C. | 95.5 | 78.0 | 65.9 | 71.4 | 83.0 | 78.0 |
| polyurethane resin varnish II | 440% | −20° C. | | | | | | |
| polyurethane resin varnish III | 600% | −20° C. | | | | | | |
| polyurethane resin varnish IV | 350% | −15° C. | | | | | | |
| ethylene-vinyl acetate copolymer resin varnish I | 900% | −30° C. | | | | | | |
| ethylene-vinyl acetate copolymer resin varnish II | 300% | −20° C. | | | | | | |
| ethylene-vinyl acetate copolymer resin varnish III | 880% | −75° C. | | | | | | |
| ethylene-ethyl acrylate coplymer resin varnish | 800% | −75° C. | | | | | | |
| polyolefin resin varnish | 500% | −40° C. | | | | | | |
| chlorinated ethylene-vinyl acetate copolymer resin varnish | 600% | −50° C. | | | | | | |
| Component (B) | | | | | | | | |
| polyisocyanate resin varnish | | | | | | | | 3.7 |
| block isocyanate resin varnish | | | 4.5 | 3.7 | 3.1 | 8.2 | 0.2 | |
| n-butylated urea resin varnish | | | | | | | | |
| isobutylated melamine resin varnish | | | | | | | | |
| Pigment | | | | | | | | |
| titanium dioxide | | | | 18.2 | 15.8 | 20.4 | 15.8 | 18.2 |
| carbon black | | | | 0.1 | 0.2 | | | 0.1 |
| conductive carbon black | | | | | | | 1.0 | |
| calcium carbonate | | | | | 15.0 | | | |
| component (A)/component (B) | | | 85/15 | 85/15 | 85/15 | 70/30 | 99.1 | 85/15 |
| pigment/components (A) + (B) | | | 0 | 1.0 | 2.0 | 1.0 | 1.0 | 1.0 |
| Paint for top coat | | | Melami No. 1 Red | Melami No. 1 Red | Melami No. 1 Red | Melami No. 1 Red | Melami No. 1 Red | Melami No. 1 Red |

| Primer composition | Example 7 | 8 | 9 | 10 | 11 | 12 | 13 | 14 | 15 |
|---|---|---|---|---|---|---|---|---|---|
| Component (A) | | | | | | | | | |
| polyurethane resin varnish I | 77.3 | 76.6 | 39.0 | 77.0 | | | | | |
| polyurethane resin varnish II | | | 39.0 | | 78 | | | | |
| polyurethane resin varnish III | | | | | | 82.5 | | | |
| polyurethane resin varnish IV | | | | | | | | | |
| ethylene-vinyl acetate copolymer resin varnish I | | | | | | | 78.0 | | |
| ethylene-vinyl acetate copolymer resin varnish II | | | | | | | | | |
| ethylene-vinyl acetate copolymer resin varnish III | | | | | | | | 87.6 | |
| ethylene-ethyl acrylate coplymer resin varnish | | | | | | | | | 87.6 |
| polyolefin resin varnish | | | | | | | | | |
| chlorinated ethylene-vinyl acetate copolymer resin varnish | | | | | | | | | |
| Component (B) | | | | | | | | | |
| polyisocyanate resin varnish | | | | | | | | | |
| block isocyanate resin varnish | | | 3.7 | | 3.7 | 2.9 | 3.7 | 2.1 | 2.1 |
| n-butylated urea resin varnish | 4.5 | | | 3.0 | | | | | |
| isobutylated melamine resin varnish | | 5.4 | | 1.8 | | | | | |
| Pigment | | | | | | | | | |
| titanium dioxide | 18.2 | 17.5 | 18.2 | 18.1 | 18.2 | 14.6 | 18.3 | 9.3 | 10.3 |
| carbon black | | 0.5 | 0.1 | 0.1 | 0.1 | | | | |
| conductive carbon black | | | | | | | | 1.0 | |
| calcium carbonate | | | | | | | | | |
| component (A)/component (B) | 85/15 | 85/15 | 85/15 | 85/15 | 85/15 | 85/15 | 85/15 | 85/15 | 85/15 |
| pigment/components (A) + (B) | 1.0 | 1.0 | 1.0 | 1.0 | 1.0 | 1.0 | 1.0 | 1.0 | 1.0 |
| Paint for top coat | Melami No. 1 Red | Melami No. 1 Red | Melami No. 1 Red | Melami No. 1 Red | Melami No. 1 Red | Melami No. 1 Red | Melami No. 1 Red | Melami No. 1 Red | Melami No. 1 Red |

TABLE 1-continued

| Primer composition | Example 16 | Example 17 | Comparative Example 1 | 2 | 3 | 4 | 5 | 6 | 7 |
|---|---|---|---|---|---|---|---|---|---|
| Component (A) | | | | | | | | | |
| polyurethane resin varnish I | | | 68.9 | 83.3 | 63.9 | | | | 78.0 |
| polyurethane resin varnish II | | | | | | | | | |
| polyurethane resin varnish III | | | | | | | | | |
| polyurethane resin varnish IV | | | | | | 82.5 | | | |
| ethylene-vinyl acetate copolymer resin varnish I | | | | | | | | | |
| ethylene-vinyl acetate copolymer resin varnish II | | | | | | | 82.5 | | |
| ethylene-vinyl acetate copolymer resin varnish III | | | | | | | | | |
| ethylene-ethyl acrylate coplymer resin varnish | | | | | | | | | |
| polyolefin resin varnish | 91.0 | | | | | | | | |
| chlorinated ethylene-vinyl acetate copolymer resin varnish | | 82.5 | | | | | | | |
| Component (B) | | | | | | | | | |
| polyisocyanate resin varnish | | | | | | | | | |
| block isocyanate resin varnish | 1.5 | 2.9 | 9.9 | | 3.0 | 2.9 | 2.9 | | 3.7 |
| n-butylated urea resin varnish | | | | | | | | | |
| isobutylated melamine resin varnish | | | | | | | | | |
| Pigment | | | | | | | | | |
| titanium dioxide | 7.5 | 14.0 | 20.0 | 16.7 | 30.0 | 14.6 | 14.5 | | 18.2 |
| carbon black | | 0.6 | 1.2 | | | | 0.1 | | 0.1 |
| conductive carbon black | | | | | 3.1 | | | | |
| calcium carbonate | | | | | | | | | |
| component (A)/component (B) | 85/15 | 85/15 | 65/35 | 100/0 | 85/15 | 85/15 | 85/15 | | 85/15 |
| pigment/components (A) + (B) | 1.0 | 1.0 | 1.0 | 1.0 | 2.2 | 1.0 | 1.0 | | 1.0 |
| Paint for top coat | Melami No. 1 Red | Melami No. 1 Red | Melami No. 1 Red | Melami No. 1 Red | Melami No. 1 Red | Melami No. 1 Red | Melami No. 1 Red | Melami No. 1 Red | Plagloss No. 3000 Red |

The following tests were made with respect to the coatings on the steel sheet and plastic sheet to obtain results as shown in the following Table 2.

Test and evaluation methods

1. Chipping resistance
   Testing machine:
   gravelometer made by Suga Shikenki K.K.
   Testing stone:
   No. 7 hard pulverized sand (diameter: 2-3 mm) 100 g/test
   Air pressure blown: 4 kg/cm²
   Blowing angle: 90°
   Sheet temperature: 20° C.

The test was made under the above conditions to evaluate the peeling state of the coating (CP-I) and the number of rusting points generated (CP-II).
   Evaluation standard of CP-I:
   Peeling diameter of less than 0.5 mm, ○ (excellent)
   Peeling diameter of not less than 0.5 mm but less than 1.0 mm, Δ (acceptable)
   Peeling diameter of not less than 1.0 mm, x (bad)

The evaluation of CP-II was made by the number of rusting points generated after 72 hours by spraying salt (5% salt water, temperature: 35° C.) to the test sheet.
   Rust number of less than 20, ○ (excellent)
   Rust number of not less than 20 but less than 50, Δ (acceptable)
   Rust number of not less than 50, x (bad)

2. Heating-cooling cycle property
   A cross cut of 50 mm × 50 mm was formed on the test sheet, which was subjected to a cycle of heating at 50° C. and 95% RH for 16 hours→cooling at 20° C. for 0.5 hour→cooling at −40° C. for 3 hours→cooling at 20° C. for 1 hour→heating at 80° C. for 3 hours→cooling at 20° C. for 0.5 hour three times to evaluate the presence of cracks in the coating.
   The evaluation standard was as follows.
   Absence of crack ○ (excellent)
   Presence of cracks x (bad)

3. Gasoline resistance
   The test sheet was immersed in gasoline for 1 hour to evaluate color change, swelling, peeling and the like of the coating. The evaluation standard was ○ (no change; excellent), Δ (slightly change; acceptable) and x (considerably change; bad).

4. Polishing property
   The test sheet was ground with an abrasive paper (#1500), rubbed with Unicon FMC-830H (trade name, made by Ishihara Sangyo Kaisha, Ltd.) as a repair abrasive, and further polished with Soft 99 Luster (trade name, made by Nitto Chemical Industry Co., Ltd.) as a polishing wax to evaluate the appearance of the coating. The evaluation standard was as follows.
   no reduction of gloss as compared with initial stage: ○ (excellent)
   slight reduction of gloss as compared with initial stage: Δ (acceptable)
   considerable reduction of gloss as compared with initial stage: x (bad)

5. Impact resistance at low temperature (High-speed impact test)
   A value of impact energy when a point of impact shot through the test sheet was measured by means of a high-speed impact testing machine made by Rheometric Corporation under such conditions that a tip diameter of impact point was 1.6 cm (5/8 inch), a holder was 5.1 cm (2 inch) and an impact speed was 11.1 m/sec., from which a yield energy value (joule) at −40° C. was calculated.
   The larger the numerical value, the better the impact resistance at low temperature.

TABLE 2

| Test items / Sheet material | Example 1 | 2 | 3 | 4 | 5 | 6 | 7 | 9 | 10 | 11 | 12 | 13 |
|---|---|---|---|---|---|---|---|---|---|---|---|---|
| Steel sheet | | | | | | | | | | | | |
| chipping resistance CP-I | ○ | ○ | ○ | ○ | ○ | ○ | ○ | ○ | ○ | ○ | ○ | ○ |
| chipping resistance CP-II | ○ | ○ | ○ | ○ | ○ | ○ | ○ | ○ | ○ | ○ | ○ | ○ |
| heating-cooling cycle property | ○ | ○ | ○ | ○ | ○ | ○ | ○ | ○ | ○ | ○ | ○ | ○ |
| gasoline resistance | ○ | ○ | ○ | ○ | ○ | ○ | ○ | ○ | ○ | ○ | ○ | ○ |
| polishing property | ○ | ○ | ○ | ○ | ○ | ○ | ○ | ○ | ○ | ○ | ○ | ○ |
| PA | | | | | | | | | | | | |
| chipping resistance CP-I | ○ | ○ | ○ | ○ | ○ | ○ | ○ | ○ | ○ | ○ | ○ | ○ |
| heating-cooling cycle property | ○ | ○ | ○ | ○ | ○ | ○ | ○ | ○ | ○ | ○ | ○ | ○ |
| gasoline resistance | ○ | ○ | ○ | ○ | ○ | ○ | ○ | ○ | ○ | ○ | ○ | ○ |
| polishing property | ○ | ○ | ○ | ○ | ○ | ○ | ○ | ○ | ○ | ○ | ○ | ○ |
| impact resistance at low temperature (joule) | 10~12 | 10~12 | 10~12 | 10~12 | 10~12 | 10~12 | 10~12 | 10~12 | 10~12 | 10~12 | 10~12 | 10~12 |
| PBT | | | | | | | | | | | | |
| chipping resistance CP-I | ○ | ○ | ○ | ○ | ○ | ○ | ○ | ○ | ○ | ○ | ○ | ○ |
| heating-cooling cycle property | ○ | ○ | ○ | ○ | ○ | ○ | ○ | ○ | ○ | ○ | ○ | ○ |
| gasoline resistance | ○ | ○ | ○ | ○ | ○ | ○ | ○ | ○ | ○ | ○ | ○ | ○ |
| polishing property | ○ | ○ | ○ | ○ | ○ | ○ | ○ | ○ | ○ | ○ | ○ | ○ |
| impact resistance at low temperature (joule) | 40~50 | 40~50 | 40~50 | 40~50 | 40~50 | 40~50 | 40~50 | 40~50 | 40~50 | 40~50 | 40~50 | 40~50 |
| SMC | | | | | | | | | | | | |
| chipping resistance CP-I | ○ | ○ | ○ | ○ | ○ | ○ | ○ | ○ | ○ | ○ | ○ | ○ |
| heating-cooling cycle property | ○ | ○ | ○ | ○ | ○ | ○ | ○ | ○ | ○ | ○ | ○ | ○ |
| gasoline resistance | ○ | ○ | ○ | ○ | ○ | ○ | ○ | ○ | ○ | ○ | ○ | ○ |
| polishing property | ○ | ○ | ○ | ○ | ○ | ○ | ○ | ○ | ○ | ○ | ○ | ○ |
| impact resistance at low temperature (joule) | 40~50 | 40~50 | 40~50 | 40~50 | 40~50 | 40~50 | 40~50 | 40~50 | 40~50 | 40~50 | 40~50 | 40~50 |
| PU | | | | | | | | | | | | |
| chipping resistance CP-I | ○ | ○ | ○ | ○ | ○ | ○ | ○ | ○ | ○ | ○ | ○ | ○ |
| heating-cooling cycle property | ○ | ○ | ○ | ○ | ○ | ○ | ○ | ○ | ○ | ○ | ○ | ○ |
| gasoline resistance | ○ | ○ | ○ | ○ | ○ | ○ | ○ | ○ | ○ | ○ | ○ | ○ |
| polishing property | ○ | ○ | ○ | ○ | ○ | ○ | ○ | ○ | ○ | ○ | ○ | ○ |
| impact resistance at low temperature (joule) | 30~40 | 30~40 | 30~40 | 30~40 | 30~40 | 30~40 | 30~40 | 30~40 | 30~40 | 30~40 | 30~40 | 30~40 |
| PC | | | | | | | | | | | | |
| chipping resistance CP-I | ○ | ○ | ○ | ○ | ○ | ○ | ○ | ○ | ○ | ○ | ○ | ○ |
| heating-cooling cycle property | ○ | ○ | ○ | ○ | ○ | ○ | ○ | ○ | ○ | ○ | ○ | ○ |
| gasoline resistance | ○ | ○ | ○ | ○ | ○ | ○ | ○ | ○ | ○ | ○ | ○ | ○ |
| polishing property | ○ | ○ | ○ | ○ | ○ | ○ | ○ | ○ | ○ | ○ | ○ | ○ |
| impact resistance at low temperature (joule) | 40~50 | 40~50 | 40~50 | 40~50 | 40~50 | 40~50 | 40~50 | 40~50 | 40~50 | 40~50 | 40~50 | 40~50 |

| Test items / Sheet material | Example 14 | 15 | 16 | 17 | Comparative Example 1 | 2 | 3 | 4 | 5 | 6 | 7 |
|---|---|---|---|---|---|---|---|---|---|---|---|
| Steel sheet | | | | | | | | | | | |
| chipping resistance CP-I | ○ | ○ | ○ | ○ | △ | ○ | X | △ | △ | △ | ○ |
| chipping resistance CP-II | ○ | ○ | ○ | ○ | X | ○ | X | △ | △ | △ | ○ |
| heating-cooling cycle property | ○ | ○ | ○ | ○ | ○ | X | ○ | ○ | ○ | ○ | ○ |
| gasoline resistance | ○ | ○ | ○ | ○ | ○ | ○ | ○ | ○ | ○ | ○ | ○ |
| polishing property | ○ | ○ | ○ | ○ | ○ | ○ | ○ | ○ | ○ | ○ | X |
| PA | | | | | | | | | | | |
| chipping resistance CP-I | ○ | ○ | ○ | ○ | △ | ○ | △ | △ | △ | X | ○ |
| heating-cooling cycle property | ○ | ○ | ○ | ○ | ○ | X | ○ | ○ | ○ | X | ○ |
| gasoline resistance | ○ | ○ | ○ | ○ | ○ | ○ | ○ | ○ | ○ | X | X |
| polishing property | ○ | ○ | ○ | ○ | ○ | ○ | ○ | ○ | ○ | ○ | X |
| impact resistance at low temperature (joule) | 10~12 | 10~12 | 10~12 | 10~12 | ≦9 | 10~12 | ≦9 | ≦9 | ≦9 | 10~12 | 10~12 |
| PBT | | | | | | | | | | | |
| chipping resistance CP-I | ○ | ○ | ○ | ○ | △ | ○ | △ | △ | △ | X | ○ |
| heating-cooling cycle property | ○ | ○ | ○ | ○ | ○ | X | ○ | ○ | ○ | X | ○ |
| gasoline resistance | ○ | ○ | ○ | ○ | ○ | ○ | ○ | ○ | ○ | X | X |
| polishing property | ○ | ○ | ○ | ○ | ○ | ○ | ○ | ○ | ○ | ○ | X |
| impact resistance at low temperature (joule) | 40~50 | 40~50 | 40~50 | 40~50 | ≦9 | 40~50 | ≦9 | ≦9 | ≦9 | 40~50 | 40~50 |
| SMC | | | | | | | | | | | |
| chipping resistance CP-I | ○ | ○ | ○ | ○ | X | ○ | X | △ | △ | X | ○ |
| heating-cooling cycle property | ○ | ○ | ○ | ○ | ○ | X | ○ | ○ | ○ | X | ○ |
| gasoline resistance | ○ | ○ | ○ | ○ | ○ | ○ | ○ | ○ | ○ | X | X |
| polishing property | ○ | ○ | ○ | ○ | ○ | ○ | ○ | ○ | ○ | ○ | X |
| impact resistance at low temperature (joule) | 40~50 | 40~50 | 40~50 | 40~50 | 10~20 | 40~50 | 10~20 | 10~20 | 10~20 | 40~50 | 40~50 |
| PU | | | | | | | | | | | |
| chipping resistance CP-I | ○ | ○ | ○ | ○ | △ | ○ | △ | △ | △ | X | ○ |
| heating-cooling cycle property | ○ | ○ | ○ | ○ | ○ | X | ○ | ○ | ○ | X | ○ |
| gasoline resistance | ○ | ○ | ○ | ○ | ○ | ○ | ○ | ○ | ○ | X | X |
| polishing property | ○ | ○ | ○ | ○ | ○ | ○ | ○ | ○ | ○ | ○ | X |
| impact resistance at low | 30~40 | 30~40 | 30~40 | 30~40 | ≦9 | 30~40 | ≦9 | ≦9 | ≦9 | 30~40 | 30~40 |

TABLE 2-continued

| | | | | | | | | | | | |
|---|---|---|---|---|---|---|---|---|---|---|---|
| temperature (joule) | | | | | | | | | | | |
| PC | | | | | | | | | | | |
| chipping resistance CP-I | ○ | ○ | ○ | ○ | △ | ○ | △ | △ | △ | X | ○ |
| heating-cooling cycle property | ○ | ○ | ○ | ○ | ○ | X | ○ | ○ | ○ | X | ○ |
| gasoline resistance | ○ | ○ | ○ | ○ | ○ | ○ | ○ | ○ | ○ | X | X |
| polishing property | ○ | ○ | ○ | ○ | ○ | ○ | ○ | ○ | ○ | ○ | X |
| impact resistance at low temperature (joule) | 40~50 | 40~50 | 40~50 | 40~50 | ≦9 | 40~50 | ≦9 | ≦9 | ≦9 | 40~50 | 40~50 |

As seen from Tables 1 and 2, the use of the primer composition according to the invention is excellent in chipping resistance, heating-cooling cycle property, gasoline resistance and polishing property for the steel sheet and excellent in chipping resistance, heating-cooling cycle property, gasoline resistance, polishing property and impact resistance at low temperature for all plastic sheets, so that it can ensure the good balance of total film performances required as a paint for automobiles.

On the contrary, Comparative Example 1 is poor in the chipping resistance for the steel sheet and in the chipping resistance and impact resistance at low temperature for all plastic sheets because the ratio of component (A) to component (B) is 65/35.

Since Comparative Example 2 does not use the component (B), the heating-cooling cycle property for the steel sheet and all plastic sheets is poor.

In Comparative Example 3, since the ratio of pigment to components (A)+(B) is 2.2, the chipping resistance for the steel sheet and the chipping resistance and impact resistance at low temperature for all plastic sheets are poor.

In Comparative Examples 4 and 5, the chipping resistance for the steel sheet and the chipping resistance and impact resistance at low temperature for all plastic sheets are poor because the component (A) of Comparative Example 4 has a glass transition temperature of higher than −20° C. and an elongation at break of less than 400% at 20° C., while the component (A) of Comparative Example 5 has an elongation at break of less than 400% at 20° C.

In Comparative Example 6, the chipping resistance for the steel sheet and the chipping resistance, heating-cooling cycle property and gasoline resistance for all plastic sheets are poor because the primer composition according to the invention is not used.

In Comparative Example 7, since the soft top coat is used instead of the hard top coat, the chipping resistance, heating-cooling cycle property and impact resistance at low temperature for the steel sheet and all plastic sheets are improved, but the polishing property for the steel sheet and the gasoline resistance and polishing property for all plastic sheets are poor, so that good balance of the total film performances cannot be ensured.

What is claimed is:

1. A primer composition consisting essentially of
   (A) at least one resin having a glass transition temperature of not higher than −20° C. and an elongation at break of not less than 400% at 20° C., and being an ethylene-vinyl acetate copolymer or a chlorinated ethylene-vinyl acetate copolymer resin or a modified resin thereof comprising high molecular weight elastomers and
   (B) at least one cross-linking resin selected from the group consisting of melamine resin, urea resin, polyisocyanate resin, blocked isocyanate resin and polyurethane resin,
   wherein the weight ratio as a solid resin content of component (A) to component (B) is 70-99:30-1.

2. The primer composition of claim 1, wherein component (A) is an ethylene-vinyl acetate copolymer.

3. The primer composition of claim 2, wherein component (B) is a blocked isocyanate resin.

4. The primer composition of claim 1, wherein component (A) is a chlorinated ethylene-vinyl acetate copolymer.

5. The primer composition of claim 4, wherein component (B) is a blocked isocyanate resin.

* * * * *